H. R. BARNES.
Hoes.
No. 135,462. Patented Feb. 4, 1873.
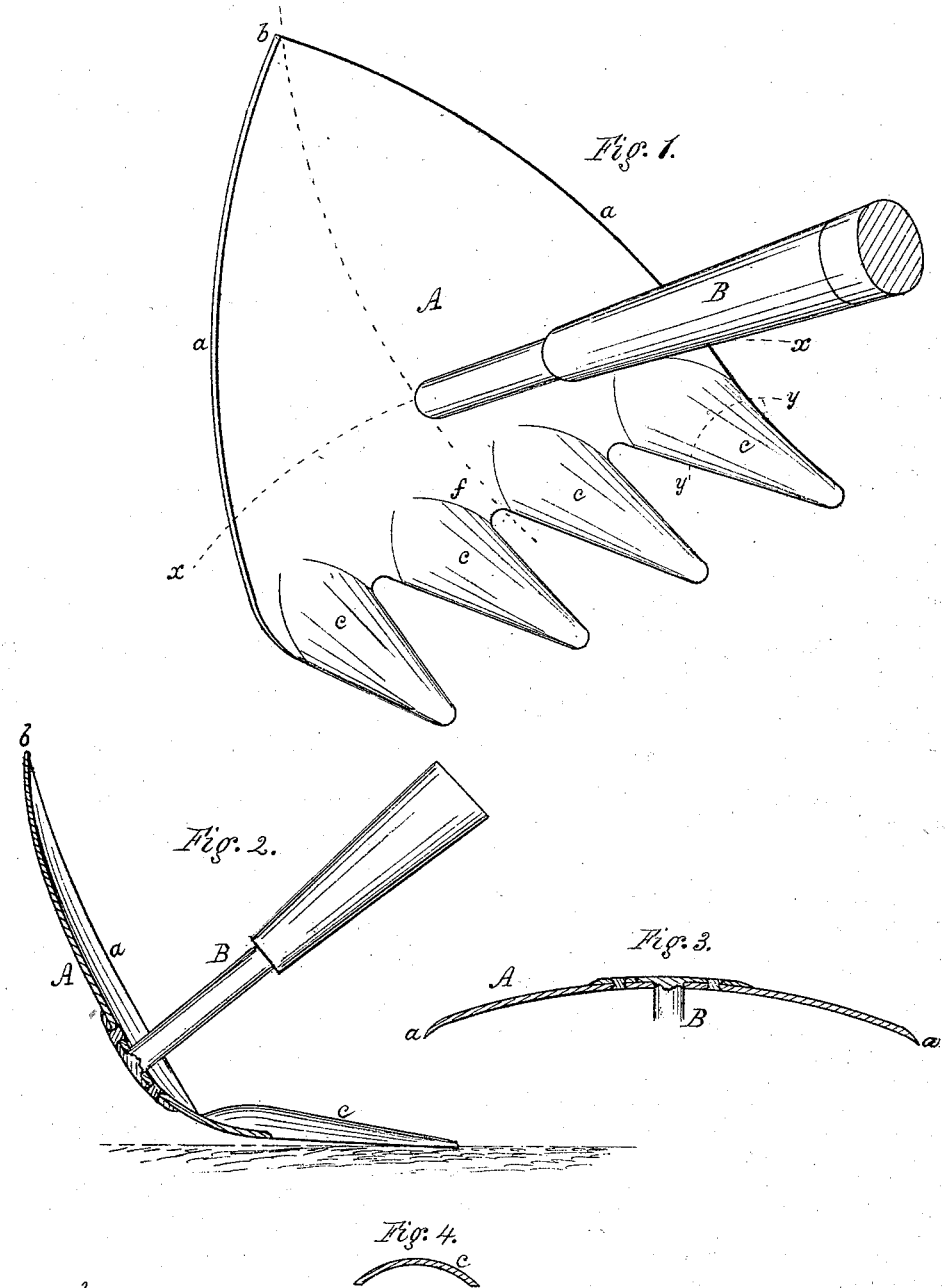
Witnesses.
Archie Barnes
Charles Engel
Inventor.
Harry R. Barnes,
per R. F. Osgood,
Atty.

UNITED STATES PATENT OFFICE.

HARRY R. BARNES, OF ROCK STREAM, NEW YORK.

IMPROVEMENT IN HOES.

Specification forming part of Letters Patent No. 135,462, dated February 4, 1873.

CASE B.

*To all whom it may concern:*

Be it known that I, HARRY R. BARNES, of Rock Stream, in the county of Yates and State of New York, have invented a certain Improvement in Hoes, of which the following is a specification:

Nature of the Invention.

My invention consists of a common hoe of triangular form, with the handles set straight from the center, two of the sides of which are made with plane cutting-edges, with an opening point at the angle, while the third is provided with a set of teeth which stand at an angle to the face of the hoe, all as hereinafter described.

General Description.

In the drawing, Figure 1 is a perspective view; Fig. 2, a vertical section; Fig. 3, a section in line $x$ $x$, Fig. 1; Fig. 4, a section in line $y$ $y$, Fig. 1.

A represents the blade of the hoe, which is made concave to give strength, and of triangular form, with the handle B set straight from the center, so that either side or edge of the hoe may be used indifferently. Two of the sides $a$ $a$ are made with straight or slightly-curved cutting-edges surmounted by an apex, $b$, which serves at any time as an opening point or digger. The third side has a series of angular teeth, $c$ $c$ $c$, which are so turned from the line of the body of the hoe as to rest nearly but not quite flat upon the surface of the ground when in use. These teeth are "struck up" or corrugated from the under side to give strength and stiffness, and to allow grinding on a common grindstone, as described in another application for patent I have made out for filing contemporaneous with this.

The advantages of the hoe are as follows: The handle being set in straight to the center, either of the three sides of the blade may be employed indifferently, each serving an independent purpose, while the apex at the top serves as a convenient digger when desired. The side $f$, by reason of its teeth $c$ $c$, is most desirable for common uses, as the teeth set on the angle shown have more tendency to enter lightly into the ground than a straight edge. The peculiar angle at which they are set and the stiffness given to them by the corrugations make them effective for the purposes designed, and the draft is very light and easy. At the same time the plain edges are of use in some places where the teeth could not be employed so advantageously—for instance, between narrow rows of garden vegetables. The point $b$ is of great service as a common digger and grubber. I am aware of no hoe where all these qualities are united in one instrument.

This instrument is adapted to all purposes where a hoe is required, but is especially adapted to gardens, as its several cutting sides can be employed for various uses where a single one could not. Although of triangular form, its capacity for cutting or for holding dirt is equal to the common hoe.

Claim.

I do not claim broadly a triangular hoe; nor do I claim broadly projecting teeth on a hoe; but

What I claim, and desire to secure by Letters Patent, as a new article of manufacture, is—

A triangular hoe of concave form, when constructed with the plain edges $a$ $a$ on two sides, and the projecting teeth $c$ $c$ on the third, as herein shown and described, and for the purpose specified.

In witness whereof I have hereunto signed my name in the presence of two subscribing witnesses.

HARRY R. BARNES.

Witnesses:
CHARLES MILES,
C. W. BARNES.